United States Patent [19]

Glass et al.

[11] Patent Number: 5,045,326

[45] Date of Patent: Sep. 3, 1991

[54] NON-STALING AERATED BUBBLE GUM

[75] Inventors: Michael Glass, Fair Lawn, N.J.; Kenneth P. Bilka, Floral Park, N.Y.; Subraman R. Cherukuri, Towaco, N.J.; Gul Mansukhani, Staten Island, N.Y.; Michael J. Killeen, Lafayette, N.J.; James Duggan, Rockford, Ill.

[73] Assignee: Warner-Lambert Company, Morris Plains, N.J.

[21] Appl. No.: 441,136

[22] Filed: Nov. 22, 1989

[51] Int. Cl.$^5$ .................................. A23G 3/30
[52] U.S. Cl. ........................ 426/5; 426/448; 426/516
[58] Field of Search ................ 426/5, 448, 516

[56] References Cited

U.S. PATENT DOCUMENTS

| | | | |
|---|---|---|---|
| 1,852,005 | 4/1932 | Garbutt | 426/5 |
| 2,973,273 | 2/1961 | Curtiss | 99/135 |
| 3,020,164 | 2/1962 | Forkner | 426/5 |
| 3,912,817 | 10/1975 | Sapsowitz | 426/5 |
| 4,233,319 | 11/1980 | Fritz | 426/5 |
| 4,252,830 | 2/1981 | Kehoe | 426/5 |
| 4,301,178 | 11/1981 | Witzel et al. | 426/5 |
| 4,317,837 | 3/1982 | Kehoe | 426/5 |
| 4,328,249 | 5/1982 | Mackay et al. | 426/3 |
| 4,491,596 | 1/1985 | Elias | 426/5 |
| 4,721,620 | 1/1988 | Cherukuri et al. | 426/6 |

FOREIGN PATENT DOCUMENTS 49-24226 12/1974 Japan.
53-26355 5/1978 Japan.

*Primary Examiner*—Jeanette Hunter
*Attorney, Agent, or Firm*—Daniel A. Scola, Jr.; Richard S. Bullitt

[57] ABSTRACT

A non-staling, reduced density bubble gum composition is provided by a method wherein a bubble gum composition having a preselected bubble gum base composition is aerated with an inert gas in a pressurized environment. In a preferred embodiment, aeration of the bubble gum composition is achieved by the injection of nitrogen gas into the bubble gum composition during a pressurized extrusion of the gum.

19 Claims, 2 Drawing Sheets

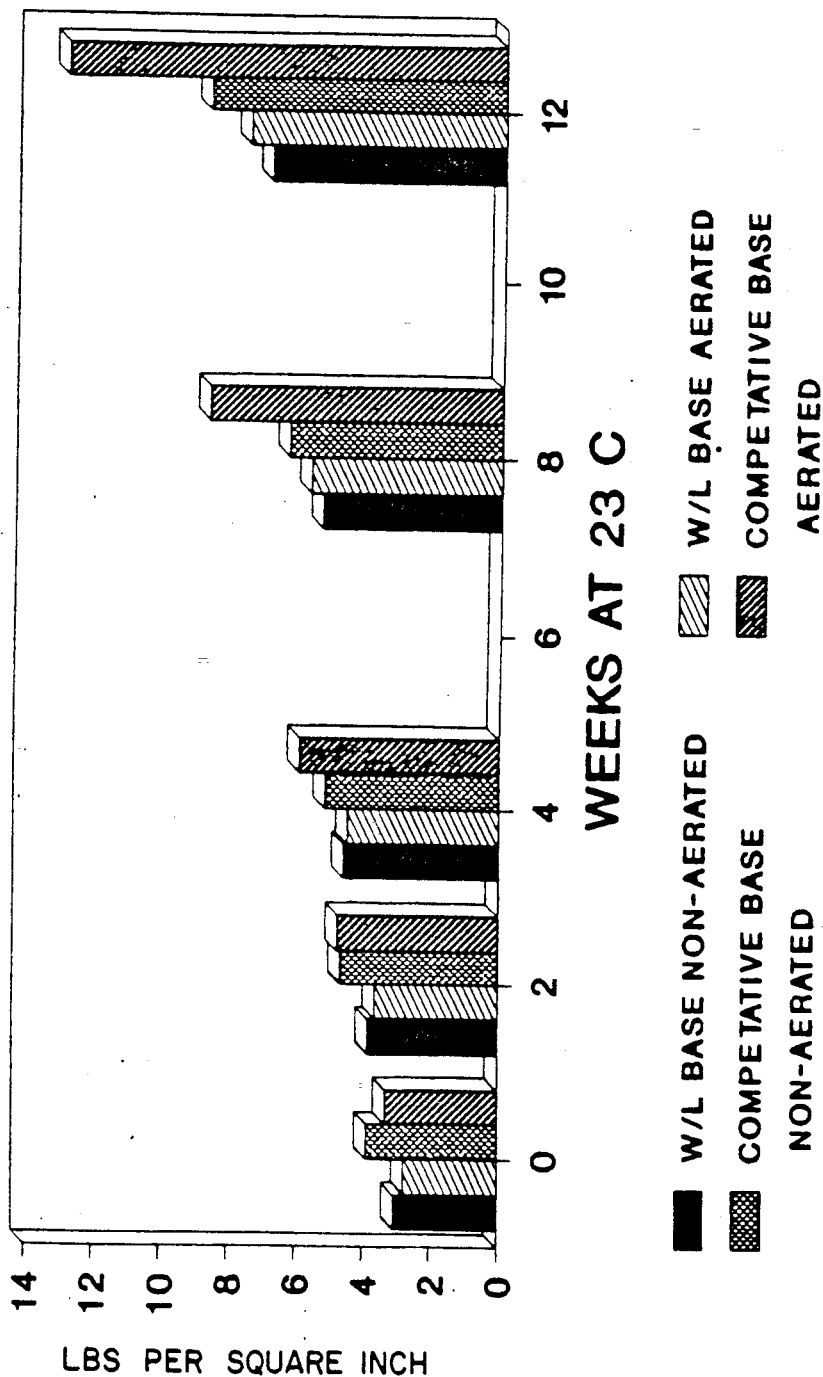

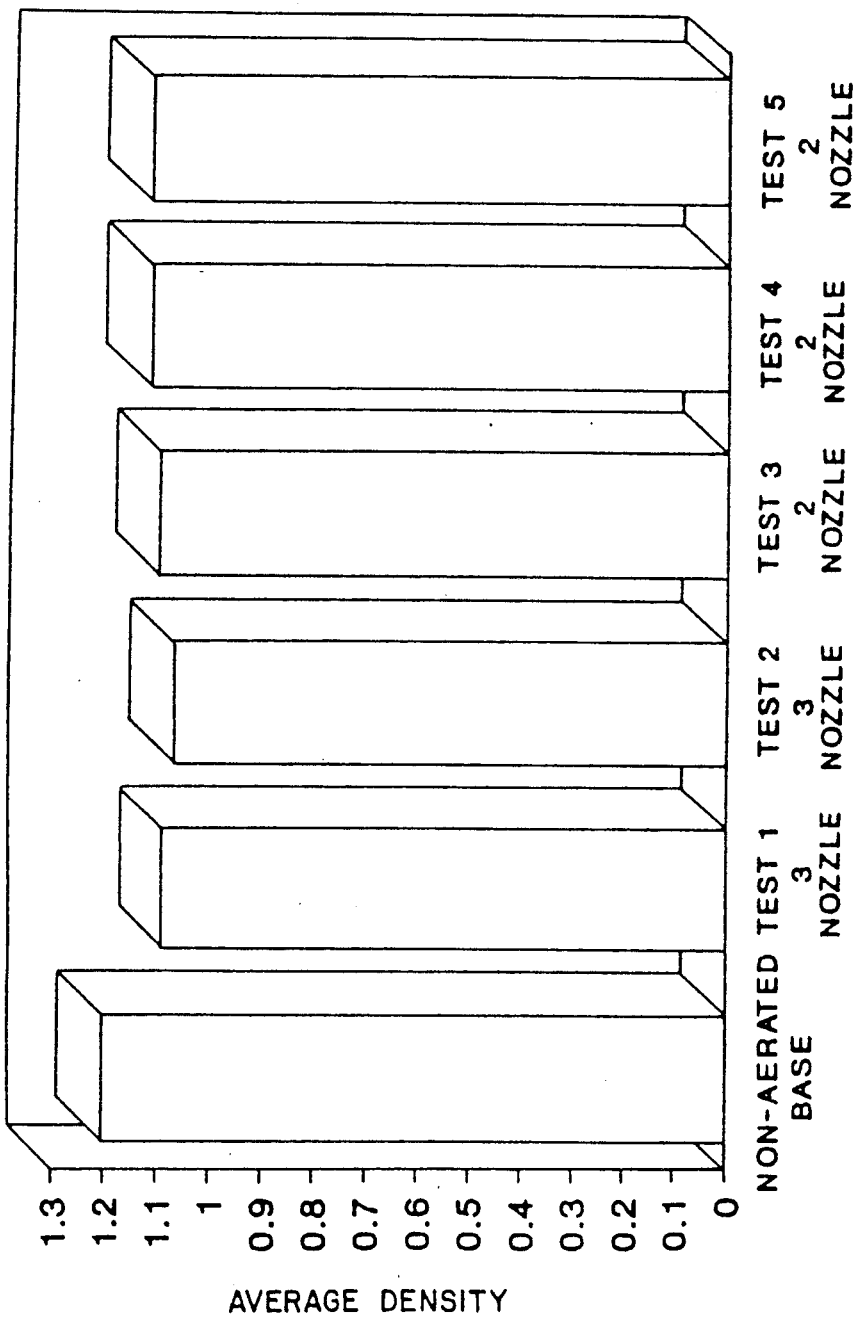

NON-STALING AERATED BUBBLE GUM

BACKGROUND OF THE INVENTION

1. Field of the Invention

The present invention relates to non-staling aerated bubble gum compositions, and more particularly to an improved aerated bubble gum which is resistant to staling which is prepared using an inert gas in the absence of oxygen. 2. Description of the Prior Art Bubble gum compositions generally contain a water-insoluble gum base, a water-soluble flavoring liquid and water-soluble sweeteners such as sucrose and corn syrup or in sugarless gum, sorbitol, mannitol and artificial sweeteners. Also incorporated within the gum base may be plasticizers or softeners to improve film forming ability, consistency and texture of the gum. The gum base generally contains a natural rubber gum base, a synthetic rubber gum base or mixtures thereof.

Several deficiencies with conventional bubble gums have existed, notably their tendency to be sticky, exhibit bitter taste when chewed, form inconsistent films when being blown so that uniform thick bubbles are not produced and become tight when chewed. Also, the sweetener component, which often comprises 50–75% of the bubble gum composition, is a major contributor to the cost of the final bubble gum product.

Various approaches have been attempted to aerate the chewing gum compositions and or reduce their densities to obtain a variety of products.

One such approach is taught by FRITZ et al., U.S. Pat. No. 4,233,319 which discloses a low density chewing gum product which includes a matrix of gas filled cells, and wherein the gum has a density of about 0.5 gm/cc. The disclosed method comprises heating a conventional gum product to alter the mass into a viscous liquid, whipping the viscous liquid with a Hobart mixer under nitrogen, and rapidly cooling the gum while subjecting it to vacuum, prior to removing the product from the molds.

In U.S. Pat. No. 4,328,249 to MACKAY et al. a method for treating a gum base to extend its shelf-life is described in which air or oxygen is swept from the gum base by means of an inert gas such as nitrogen, and the gum base is then coated with a substance such as starch hydrolysate or sorbitol solution to act as a barrier against oxygen reabsorption.

U.S. Pat. No. 4,491,596 to ELIAS shows a method for preparing an aerated gum confection wherein a candy bob syrup is mixed with a gum base to cause air to be entrapped in the mass. The product is then poured into molds, put under vacuum and cooled.

The aerated bubble gums of the prior art have been found to be deficient in that these gums tend to exhibit accelerated aging and thus stale quickly. Aerating these conventional bubble gums results in the formation of holes in the gum matrices which provide channels for moisture entry or escape. This moisture entry/escape results in a recrystallization of solids in the gum composition which causes a corresponding staleness of the gum composition.

SUMMARY OF THE INVENTION

In accordance with the present invention, a bubble gum composition has been unexpectedly discovered which has a reduced density, yet which does not exhibit accelerated aging upon storage. These aspects are accomplished by a process of aeration with an inert gas in the absence of oxygen in a pressurized environment which does not require the application of vacuum to the gum composition and which can be carried out at a lower temperature than previously possible. A unique aspect of the present invention is Applicants' discovery that the selection of a bubble gum base composition affects the non-staling properties of the final bubble gum composition. Importantly, the bubble gum base composition must be stable in the presence of an inert gas.

In a preferred embodiment, the non-staling, reduced density bubble gum composition of the invention has a density of from about 1.07 to about 1.12 g/cc.

In another preferred embodiment, a method of forming a non-staling, reduced density bubble gum composition comprises: a) providing a bubble gum composition; b) introducing said bubble gum composition into a pressurized environment; c) aerating said bubble gum composition with an inert gas in the absence of oxygen, to form sub-micron sized gas bubbles in said bubble gum composition; d) releasing said bubble gum composition into an environment of lower pressure, so as to expand said gas bubbles and reduce the density of said bubble gum composition; and e) recovering said non-staling reduced density bubble gum composition wherein the density of the composition is from about 1.07 to about 1.12 g/cc.

In another preferred embodiment, a non-staling, reduced density bubble gum composition is formed by a) providing a bubble gum composition; b) introducing said bubble gum composition into a pressurized environment; c) aerating said bubble gum composition with an inert gas in the absence of oxygen, to form sub-micron sized gas bubbles in said bubble gum composition; d) releasing said bubble gum composition into an environment of lesser pressure, so as to expand said gas bubbles and reduce the density of said bubble gum composition; and e) recovering said non-staling, reduced density bubble gum composition wherein the composition has a density of about 1.07 to about 1.12 g/cc.

BRIEF DESCRIPTION OF THE DRAWINGS

FIG. 1 is a graphical representation of the hardness testing results set forth in Table III.

FIG. 2 is a graphical representation of the densities of the bubble gum compositions formed in accordance with the process of Example 2.

DETAILED DESCRIPTION OF THE INVENTION

The bubble gum compositions useful in the present invention include any bubble gum composition in which the bubble gum base composition has been selected so as to result in a non-staling, reduced density product according to the present invention. The invention has applicability to all forms of sugared and sugarless bubble gums such as chunks, pillows and centerfilled.

A preferred bubble gum base composition is disclosed in U.S. Pat. No. 4,721,620 which comprises in weight percent:

(a) about 0.5% to 30% non-SBR elastomer selected from the group consisting of synthetic gums, synthetic elastomers, natural gums, natural elastomers and mixtures thereof, (b) an effective amount of a combination of two polyvinyl acetate polymeric materials selected from:

(1) not more than 14% of a polyvinyl acetate having a low molecular weight of about 12,000 to about 16,000; and
(2) not more than 35% of a polyvinyl acetate having a medium molecular weight of about 35,000 to 55,000;
wherein the polyvinyl acetate polymeric materials are present in a mole ratio of 1:2 to 1:45 based on the low molecular weight polyvinyl acetate to the medium molecular weight polyvinyl acetate; and
(c) about 5% to about 12% of an acetylated monoglyceride having a saponification value above about 400.

The elastomers useful in the present gum base composition include those non-styrene butadiene rubber (non-SBR) elastomers normally included in gum bases. Illustrative elastomers include synthetic gums or elastomers such as polyisobutylene and isobutylene-isoprene copolymers; natural gums or elastomers such as chicle, natural rubber, jelutong, balata, guttapercha, lechi caspi, sorva or mixtures thereof. Among these, polyisobutylene, isobutylene-isoprene copolymers or mixtures thereof are preferred.

A preferred elastomer is a polyisobutylene which has an average molecular weight of 45,000 to 68,000 (determined by the Flory method). Hard elastomers, that is those having a molecular weight around 1 million are not usable in this preferred bubble gum base composition. The low molecular weight polyisobutylene component may be used as a single polyisobutylene material or combination of different polyisobutylene compounds provided each has a molecular weight within the range defined. The use of a combination of elastomers has been found beneficial to achieve a bubble gum composition having the desired elasticity and texture.

The elastomer content employed is in an amount of about 0.5 to about 30%, and preferably about 5 to about 20% by weight of the gum base. When the total amount of elastomer is below 0.5% the base composition lacks elasticity, chewing texture, and cohesiveness, whereas at amounts above 30% the formulation is hard and rubbery.

Polyvinyl acetate (PVA) is an essential ingredient in the preferred bubble gum base compositions utilized in this invention. The polyvinyl acetate used must comprise a combination of two different types of PVA. The first component is a low molecular weight material having about 12,000 to about 16,000 mean average molecular weight. Such material will have a preferred viscosity of 14 to 16 seconds (ASTM D1200-82 using a Ford cup viscosity procedure). This low molecular weight component is used in amounts up to 14% by weight of the gum base, and preferably from about 5% to about 12% by weight. The second PVA component is a medium molecular weight variety having a mean average molecular weight of about 35,000 to about 55,000. Such material will have a preferred viscosity of 35 to 55 seconds (ASTM designation D1200-82 using a Ford cup viscometer procedure). This medium molecular weight component is used in amounts up to 35% by weight of the gum base and preferably from about 25% to about 35% by weight. It has been found that the use of a blend of these two PVA components is essential to prepare a bubble gum base that results in a gum composition that has good film forming properties and maintenance of a thick bubble shape. In addition to the required presence of these components, the components must also be present in a particular ratio. In particular the mole ratio of the low molecular weight PVA to the medium molecular weight PVA should be from 1:2 to 1:45. Lower amounts of low molecular weight component result in thicker films that are tight and unable to form effective bubbles. Higher amounts of low molecular weight component form thin bubble gums that lack elasticity.

As an optional embodiment of the preferred bubble gum base composition, it is possible to employ small amounts of high molecular weight PVA in combination with the low and medium molecular weight components. The high molecular weight PVA may be used in amounts of 0 to 5% by weight of the base and has a mean average molecular weight of 65,000 to 95,000. Amounts above 5% result in a tight gum chew character and are unable to form adequate bubble-films in these formulations.

In addition to the critical PVA constituents, it has been found essential to employ in the preferred bubble gum base composition a particular mild plasticizer, namely an acetylated monoglyceride having a saponification value above about 400 and preferably between about 430 and about 470. Additionally the acetylated monoglyceride has a percent acetylation above 90%, a hydroxyl value below 10 and a Reichert Meissl value above 150 (Food Chemical Codes(FCC)III/P508 and the revision by AOCS). Acetylated monoglycerides having lower saponification values are not effective in the formulations of the preferred bubble gum base composition.

The acetylate monoglycerides of the preferred bubble gum base composition are used in amounts of about 5% to about 12% and preferably about 7% to about 10%.

In addition to the foregoing essential ingredients, the preferred bubble gum base composition includes a variety of traditional ingredients, such as elastomer solvent, emulsifiers, plasticizers, waxes and mixtures thereof.

The preferred bubble gum base composition elastomer solvents aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use in the preferred bubble gum base composition include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated methyl ester of rosin; terpene resins including polyterpene and polymers of alpha-pinene or beta-pinene and mixtures thereof. The elastomer solvent may be employed in an amount ranging from about 2% to about 18% and preferably about 7% to about 12% by weight of the gum base. Amounts below about 2% cause unacceptable chew characteristics. Amounts above 18% cause a soft product to be formed which results in a product which sticks to the face.

Useful optional emulsifiers in the formulations of the preferred bubble gum base composition include glycerol monosterate, lecithin, fatty acid monoglycerides, diglycerides, propylene glycol monostearate and mixtures thereof. Glycerol monostearate is most preferred. When emulsifiers are absent, the formulation has poor stability and lacks acceptable texture. This emulsifier improves hydrophilic character. The emulsifier is employed in amounts of about 2% to about 10% and preferably about 4% to about 8% by weight of the base.

The preferred bubble gum base composition preferably employs a wax material. The waxes have been found to soften the rubber elastomer mixture and improve elasticity of the chew character. The waxes employed are preferably microcrystalline wax, natural wax, petroleum wax, paraffin wax and mixtures thereof. Useful amounts are from about 5% to about 18% by weight and preferably from about 7% to about 12% by Weight of the gum base composition. The waxes employed preferably have a melting point above about 170° F. in order to obtain a consistent chew property. Use of waxes having lower melting points increases tackiness.

A variety of traditional ingredients such as plasticizers or softeners may optionally be added into the preferred bubble gum base composition. Such materials include hydrogenated vegetable oils, lanolin, stearic acid, sodium stearate, potassium stearate, glycerine and the like and mixtures thereof. Such materials when incorporated into the preferred gum base obtain a variety of desirable textures and consistency properties. These individual materials are generally employed in amounts of about 6% to about 20% by weight and preferably in amounts of from about 9% to about 17% by weight of the preferred gum base composition. This preferred bubble gum base composition may be formulated into a variety of bubble gum compositions utilizing standard procedures and equipment. A bubble gum composition may be prepared by combining conventional ingredients such as sweeteners, flavors, colorants and the like.

The amount of the preferred gum base employed will vary depending on such factors as the type of base used, consistency desired and other components used to make the final product. In general, amounts from about 5% to about 45% by weight of the final gum base composition are acceptable with preferred amounts of about 15% to about 25% by weight being usable.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof and natural sweeteners such as dihydrochalcone, glycyerhizin and stevia rebardiana (Stevioside).

B. Water-soluble artificial sweeteners such as the soluble saccharin salts, i.e., sodium or calcium saccharin salts, cyclamate salts, acesulfam-K and the like, the free acid form of saccharin, and chlorinated sugar derivatives such as sucralose.

C. Dipeptide based sweeteners such as L-aspartyl-L-phenylalanine methyl ester (aspartame) and Alitame.

In general, the amount of sweetener will vary with the desired amount of sweetener selected for a particular bubble gum. This amount will normally be 0.001% to about 90% by weight when using an easily extractable sweetener. The water-soluble sweeteners described in category A above, are preferably used in amounts of about 25% to about 75% by weight, and most preferably from about 50% to about 65% by weight of the final bubble gum composition. In contrast, the artificial sweetener described in categories B and C are used in amounts of about 0.005% to about 5.0% and most preferably about 0.05% to about 2.5% by weight of the final bubble gum composition. These amounts are ordinarily necessary to achieve a desired level of sweetness independent from the flavor level achieved from flavor oils.

Flavoring agents well known to the bubble gum art may be added to the bubble gum compositions of the instant invention. These flavoring agents may be chosen from synthetic flavoring liquids and/or oils derived from plants leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 2.0% by weight of the final chewing gum composition are usable with amounts of about 0.8% to about 1.5% being preferred.

The bubble gum composition is prepared by conventional methods. An illustrative process involves first melting the gum base at a temperature from about 70° to about 120° C. and mixing the gum base in a kettle with a liquid softener and/or an emulsifier for 2 to 8 minutes. To this mixture ½ to ¾ of the sugar ingredients and colors are added and mixing is continued for 1 to 4 minutes. To this mixture the remaining sugar ingredients are added and while mixing is continued, the flavoring agent is slowly added. Mixing is maintained for 1 to 4 minutes. To this mixture a humectant can be added and mixing is continued for 1 to 4 minutes. The bubble gum composition is discharged from the kettle.

The bubble gum composition may then be cooled and stabilized in a conditioning room or processed immediately through an extruder to perform the aeration procedure. If the composition is cured, it is simply warmed up and then passed into the extruder to enable aeration to be conducted. Warming may be done at temperatures from about 40° to 90° C. with preferred temperatures around 50° to 75° C.

The aeration procedure is provided in a pressurized environment. The pressurized environment useful in the present invention is provided by equipment such as pressurized mixers or extruders, and preferably comprises an extruder device which has been modified to allow the application or injection of a gas to the material undergoing extrusion.

A suitable extruder which provides a pressurized environment for the bubble gum composition is a screw process extruder such as a "Weisert Loser" three auger extruder, in which openings have been provided for the incorporation of gas nozzles. The use of screw process extruders is well known in the art of bubble gum manufacture.

To provide a consistent rate of inert gas distribution into the bubble gum composition and to have this distribution proportioned throughout the product for equal and consistent texture, the openings in the extruder should be formed in the center of the main auger extrusion tube area. This location corresponds to the site of maximum extrusion pressure.

The aeration of the bubble gum composition according to the invention is carried out with any chemically inert gas in the absence of oxygen, but preferably with nitrogen gas.

In order to properly feed the nitrogen gas, the applied gas pressure must be slightly higher than the maximum extrusion pressure in the extruder body. Also, as the bubble gum composition is passed through the extruder, it is necessary to continue injection of gas until pressure in the extruder body is relieved at the conclusion of a run or any other shutdown of the extruder, so as to avoid a backfilling of the nozzles.

The degree of aeration achieved is a function of nozzle geometry, length of the extrusion chamber, differential pressure of nitrogen gas supply compared to extrusion chamber pressure, and bubble gum composition, texture and temperature. Adjustment and optimization of these factors falls within the skill of the ordinary artisan, and therefore will not be further described as they are not essential to an understanding and practice of the present invention. For example, the degree of aeration achieved with respect to different flavors of bubble gum may vary under identical treatment conditions, and adjustment of the gas injection rate, nozzle size, and so forth may be necessary to provide the desired degree of aeration.

The preferred range of inert gas aeration pressures has been found to be from about 275 to about 400 p.s.i., depending upon operating conditions.

Aeration of the bubble gum composition in an extruder environment results in the formation of submicron sized gas bubbles in the bubble gum composition.

Releasing the bubble gum composition into an environment of lesser pressure results in the expansion of the gas bubbles in the composition, and a resultant reduction in bubble gum composition density. The density of the products produced herein are significantly lower than the composition's starting density, and preferably is from about 1.07 to about 1.12 g/cc. Higher densities do not result in the formation of products that are acceptable herein since they have virtually the same values as normal bubble gum whereas lower density products do not possess acceptable film forming properties expected from bubble gum compositions.

Preferably, and unlike prior methods, the gas-containing bubble gum composition is released to normal atmospheric pressure (approximately 1 atm), without the application of vacuum.

Recovery of the non-staling, reduced density bubble gum composition is achieved by conventional means, such as by providing a moving conveyor for transporting the gum as it exits from the extrusion device. Once recovered from the extrusion device, the bubble gum can be cut, wrapped or otherwise processed, as known to those skilled in the art. An advantage of the present invention is the relatively few alterations of the conventional bubble gum processing machinery which need to be made in order to achieve the results of the invention.

Thus, wrapping machinery, for example, need only be minimally adjusted to function effectively with the less dense bubble gum product, since the gum has identical geometrical dimensions compared to a nonaerated product.

The following examples are given to illustrate the invention, but are not deemed to be limiting thereof. All percentages given throughout the specification are based upon weight of the bubble gum composition, unless otherwise indicated with the total weight being 100% by weight.

EXAMPLE 1

This example illustrates the formation of a wide variety of non-staling, reduced density bubble gum compositions according to the present invention.

Using both inventive and comparative formulations, products were aerated using nitrogen gas. The aeration process was conducted using an extrusion cut and wrap bubble gum operation while nitrogen gas was pumped into the gum rope during processing. Aeration levels of 7 to 14% were achieved on all formulations. Aeration was determined by actual density reduction. The inventive and comparative formulations had a reduction in density of 7 to 14% with comparable piece dimensions to current unaerated bubble gum. Upon aging, the inventive product remained softer than the comparative. The ingredients are recited in Table I.

TABLE I

| | (All % by weight of gum composition) | |
| --- | --- | --- |
| | Sugar or Sugarless Inventive | Sugar or Sugarless Comparative |
| Gum Base | U.S. Pat. No. 4,721,620 12-30% | Any other bubble gum base 12-30% |
| Softeners | 7-27 | 7-27 |
| Bulking Agents | 45-70 | 45-70 |
| Flavor | 0.4-2 | 0.4-2 |
| Glycerin | 0-15 | 0-15 |
| Filler | 0-25 | 0-25 |

EXAMPLE 2

This example illustrates the formation of non-staling, reduced density bubble gum compositions according to the present invention. Specifically, it illustrates the range of densities of gum compositions attained, before and after a cooling tunnel, and in the finished product. Comparative test A corresponds to a control test of a bulk sample, without aeration. Inventive Tests #1-5 show trials at a range of pressures of injected nitrogen gas as shown in Table II.

The bubble gum compositions formed according to the above inventive examples had reduced density resulting in less weight for a given geometry, provided a softer chew for all formulas and were non-staling, resulting in an extended shelf life for the product. It should be noted that the invention also can be utilized to soften the chew of older, lower cost formulas.

TABLE II

| | SAMPLE | DENSITY | | AVERAGE DENSITY | PERCENT DENSITY REDUCTION |
| --- | --- | --- | --- | --- | --- |
| | | RUN #1 | RUN #2 | | |
| Comparative Test A | Bulk | 1.28 | 1.29 | 1.29 | — |
| | Before | 1.24 | 1.22 | 1.23 | 4.7 |
| | After | 1.22 | 1.24 | 1.23 | — |

TABLE II-continued

| | SAMPLE | DENSITY RUN #1 | RUN #2 | AVERAGE DENSITY | PERCENT DENSITY REDUCTION |
|---|---|---|---|---|---|
| Inventive | Finished Product | 1.20 | 1.21 | 1.21 | 1.6 |
| Test #1 | Before | 1.08 | 1.08 | 1.09 | 11.4 |
| 3 Nozzle | After | 1.08 | 1.10 | 1.09 | 11.4 |
| 350 psi | Finished Product | 1.09 | 1.09 | 1.09 | 9.9 |
| Test #2 | Before | 1.08 | 1.09 | 1.08 | 12.2 |
| 3 Nozzle | After | 1.11 | 1.10 | 1.10 | 10.6 |
| 350 psi | Finished Product | 1.06 | 1.08 | 1.07 | 11.6 |
| Test #3 | Before | 1.04 | 1.05 | 1.05 | 14.6 |
| 2 Nozzle | After | 1.00 | 1.02 | 1.01 | 17.9 |
| 350 psi | Finished Product | 1.10 | 1.10 | 1.10 | 9.1 |
| Test #4 | Before | 1.02 | 1.02 | 1.02 | 17.1 |
| Nozzle | After | 1.01 | 1.00 | 1.00 | 18.7 |
| 275 psi | Finished Product | 1.12 | 1.12 | 1.12 | 7.4 |
| Test #5 | Before | 1.11 | 1.11 | 1.11 | 9.8 |
| 2 Nozzle | After | 1.05 | 1.03 | 1.04 | 15.5 |
| 400 psi | Finished Product | 1.11 | 1.13 | 1.12 | 7.4 |

EXAMPLE 3

This example illustrates the formation of non-staling, reduced density bubble gum compositions according to the present invention. Specifically, it illustrates the range of hardnesses of inventive and comparative gum compositions attained over a twelve week testing period.

The results of the hardness testing are set forth in Table III.

As can be seen therein, the bubble gum compositions formed in accordance with the present invention exhibited reduced hardness compared to both aerated and non-aerated comparative bubble gum compositions, over the entire twelve week testing period.

TABLE III

| | NON-STALING AERATED BUBBLE GUM HARDNESS TESTING* | | | |
|---|---|---|---|---|
| WEEKS AT 23° C. | INVENTIVE RUN 1 GUM BASE FROM U.S. Pat. No. 4,721,620 WITHOUT AERATION | INVENTIVE RUN 2 GUM BASE FROM U.S. Pat. No. 4,721,620 WITH AERATION** | COMPARATIVE RUN A ANY OTHER BASE WITHOUT AERATION | COMPARATIVE RUN B ANY OTHER BASE WITH AERATION*** |
| 0 | 3.07 | 2.77 | 3.88 | 3.34 |
| 2 | 3.86 | 3.66 | 4.68 | 5.11 |
| 4 | 4.60 | 4.47 | 5.15 | 6.20 |
| 8 | 5.31 | 5.66 | 6.29 | 9.49 |
| 12 | 6.88 | 7.54 | 8.70 | 14.53 |

*Results are in Instron Lbs. per square inch.
**Density reduction is 7.36%.
***Density reduction is 7.57%.

The invention being thus described, it will be obvious that the same may be varied in many ways. Such variations are not to be regarded as a departure from the spirit and scope of the invention and all such modifications are intended to be included within the scope of the following claims.

What is claimed is:

1. A non-staling, reduced density bubble gum composition having a density of about 1.07 to about 1.12, said bubble gum composition including a bubble gum base composition that is stable in the presence of an inert gas, said bubble gum base composition comprising in weight percent:
   (a) about 0.5% to about 30% non-SBR elastomer selected from the group consisting of synthetic gums, synthetic elastomers, natural gums, natural elastomers and mixtures thereof,
   (b) an effective amount of a combination of two polyvinyl acetate polymeric materials selected from:
      (1) not more than 14% of a polyvinyl acetate having a lower molecular weight of about 12,000 to about 16,000; and
      (2) not more than 35% of a polyvinyl acetate having a medium molecular weight of about 35,000 to 55,000; wherein the polyvinyl acetate polymeric materials are present in a mole ratio of 1:2 to 1:45 based on the low molecular weight polyvinyl acetate to the medium molecular weight polyvinyl acetate; and
   (c) about 5% to about 12% acetylated monoglyceride having a saponification value above about 400.

2. The non-staling, reduced density bubble gum composition of claim 1, wherein said bubble gum base composition is present in the amount of about 12% to about 30% by weight of the bubble gum composition.

3. The non-staling, reduced density bubble gum composition of claim 2, further including a material selected from the group consisting of natural or synthetic flavoring agents, sweeteners, coloring agents and mixtures thereof.

4. The non-staling, reduced density bubble gum composition of claim 3, wherein the flavoring agent is selected from the group consisting of peppermint oil, spearmint oil, cinnamon oil, oil of wintergreen, bubble flavor, fruit flavors and mixtures thereof.

5. The non-staling, reduced density bubble gum composition of claim 4, where said sweetener is selected from the group consisting of water-soluble sweetening agents, water-soluble artificial sweeteners, dipeptide based sweeteners and mixtures thereof.

6. A method of forming a non-staling, reduced density bubble gum composition; which comprises:
   A. providing a bubble gum composition including a bubble gum base comprising in weight percent:
      (a) about 0.5% to about 30% non-SBR elastomer selected from the group consisting of synthetic gums, synthetic elastomers, natural gums, natural elastomers and mixtures thereof,
      (b) an effective amount of a combination of two polyvinyl acetate polymeric materials selected from:
         (1) not more than 14% of a polyvinyl acetate having a low molecular weight of about 12,000 to about 16,000; and
         (2) not more than 35% of a polyvinyl acetate having a medium molecular weight of about 35,000 to 55,000; wherein the polyvinyl acetate polymeric materials are present in a mole ratio of 1:2 to 1:45 based on the low molecular weight polyvinyl acetate to the medium molecular weight polyvinyl acetate; and
      (c) about 5% to about 12% acetylated monoglyceride having a saponification value above about 400;
   B. introducing said bubble gum composition into a pressurized environment;
   C. aerating said bubble gum composition with an inert gas in the absence of oxygen gas, to form sub-micron sized gas bubble sin said bubble gum composition;
   D. releasing said bubble gum composition into an environment of lesser pressure, so as to expand said gas bubbles and reduce the density of said bubble gum composition; and
   E. recovering said non-staling, reduced density bubble gum composition;
   wherein said composition has a density of about 1.07 to about 1.12 g/cc.

7. The method of claim 6, wherein said inert gas comprises nitrogen gas.

8. The method of claim 6, wherein said bubble gum base composition is stable in the presence of an inert gas.

9. The method of claim 6, wherein said pressurized environment comprises an extrusion device.

10. The method of claim 9, wherein said aerating step comprises injecting said bubble gum composition with said inert gas in the absence of oxygen through openings in said extrusion device.

11. The method of claim 10, wherein said inert gas is injected at a pressure of from about 275 p.s.i. to about 400 p.s.i.

12. The method of claim 6, wherein said environment of lesser pressure comprises approximately 1 atm pressure.

13. The method of claim 6, wherein the density of said bubble gum composition is reduced to between about 1.07 to about 1.12 g/cc.

14. A non-staling, reduced density bubble gum composition formed by:
   (a) providing a bubble gum composition;
   (b) introducing said bubble gum composition into a pressurized environment;
   (c) aerating said bubble gum composition with an inert gas in the absence of oxygen gas, to form sub-micron sized gas bubbles in said bubble gum composition;
   (d) releasing said bubble gum composition into an environment of lesser pressure, so as to expand said gas bubbles and reduce the density of said bubble gum composition; and
   (e) recovering said non-staling, reduced density bubble gum composition;
   wherein said composition has a density of about 1.07 to about 1.12 g/cc.

15. The non-staling, reduced density bubble gum composition of claim 14, wherein said inert gas comprises nitrogen gas.

16. The non-staling, reduced density bubble gum composition of claim 14, wherein said bubble gum composition has a bubble gum base composition comprising in weight percent:
   (a) about 0.5% to about 30% non-SBR elastomer selected from the group consisting of synthetic gums, synthetic elastomers, natural gums, natural elastomers and mixtures thereof,
   (b) an effective amount of a combination of two polyvinyl acetate polymeric materials selected from:
      (1) not more than 14% of a polyvinyl acetate having a lower molecular weight of about 12,000 to about 16,000; and
      (2) not more than 35% of a polyvinyl acetate having a medium molecular weight of about 35,000 to 55,000; wherein the polyvinyl acetate polymeric materials are present in a mole ratio of 1:2 to 1:45 based on the low molecular weight polyvinyl acetate to the medium molecular weight polyvinyl acetate; and
   (c) about 5% to about 12% acetylated monoglyceride having a saponification value above about 400.

17. The non-staling, reduced density bubble gum composition of claim 14, wherein said pressurized environment comprises an extrusion device.

18. The non-staling, reduced density bubble gum composition of claim 17, wherein said aerating step comprises injecting said bubble gum composition with said inert gas through openings in said extrusion device.

19. The non-staling, reduced density bubble gum composition of claim 14, wherein said environment of lesser pressure comprises 1 atm pressure.

* * * * *